United States Patent [19]
Kanno

[11] 3,848,984
[45] Nov. 19, 1974

[54] SINGLE LENS REFLEX CAMERA
[75] Inventor: Kyusei Kanno, Tokyo, Japan
[73] Assignee: Asahi Kogaku Kogyo Kabushiki Kaisha, Tokyo-to, Japan
[22] Filed: Mar. 11, 1974
[21] Appl. No.: 450,383

[30] Foreign Application Priority Data
Mar. 23, 1973  Japan.............................. 48-32756

[52] U.S. Cl..................... 354/38, 354/50, 354/152, 354/288, 354/295
[51] Int. Cl........................ G03b 7/08, G03b 17/00
[58] Field of Search........ 354/288, 295, 26, 29, 30, 354/36, 38, 48, 50, 51, 152

[56] References Cited
UNITED STATES PATENTS
| | | | |
|---|---|---|---|
| 2,529,905 | 11/1952 | Berssenbrugge | 354/295 |
| 3,728,952 | 4/1973 | Kiyohara | 354/50 |
| 3,733,984 | 5/1973 | Yata | 354/51 |

*Primary Examiner*—Joseph F. Peters, Jr.
*Attorney, Agent, or Firm*—Steinberg & Blake

[57] ABSTRACT

A camera, such as a single lens reflex camera, having a housing and a casing capable of being detachably connected with the housing. The camera housing carries manually operable structure for determining exposure of film in a fully manual manner, the film exposure being determined in accordance with variables which include the diaphgram setting and the exposure time. The camera housing also carries part of a structure for automatically determining one of these variables, with the remaining structure for automatically determining this one variable being carried by the casing so that when the latter is connected with the camera housing it is possible to determine at least this one variable in an automatic manner. A structure which is carried by the camera housing for movement in preparation for making an exposure has its movement transmitted to structure in the casing for controlling the structure in the casing to make at least part of an automatic determination of this one variable.

8 Claims, 8 Drawing Figures

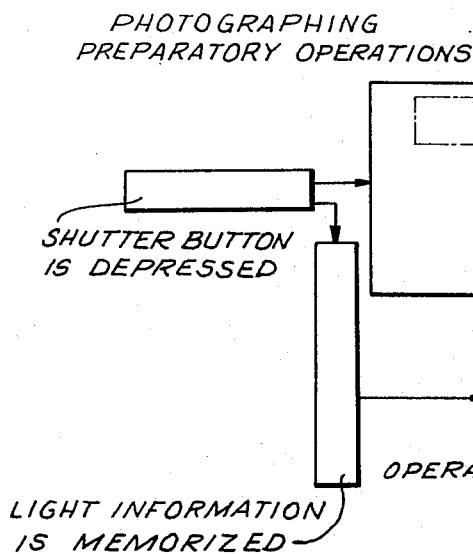
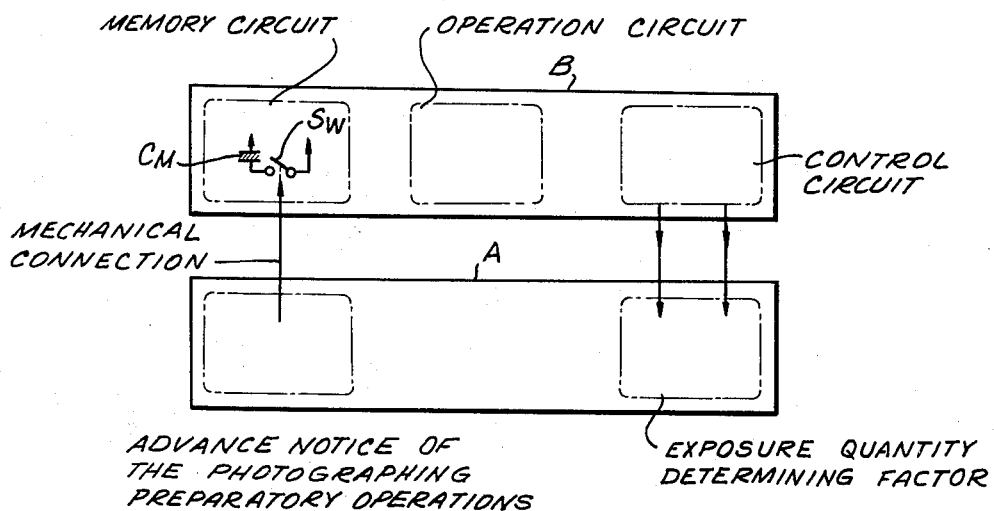

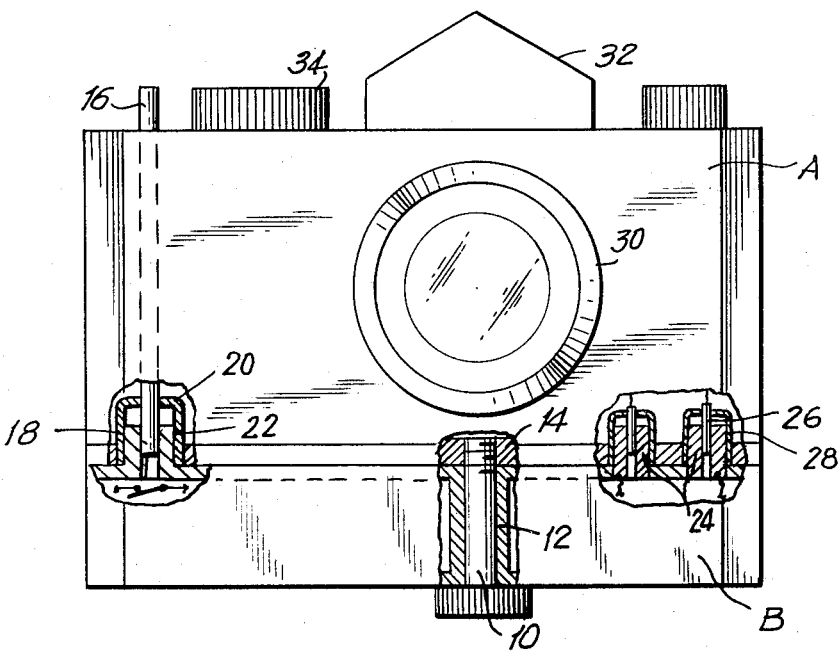
FIG. 3
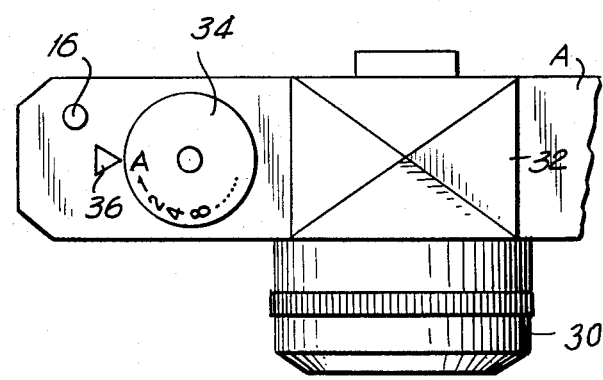
FIG. 4
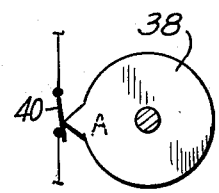
FIG. 5
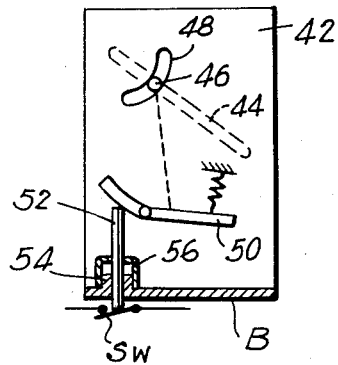
FIG. 6
FIG. 7
FIG. 8
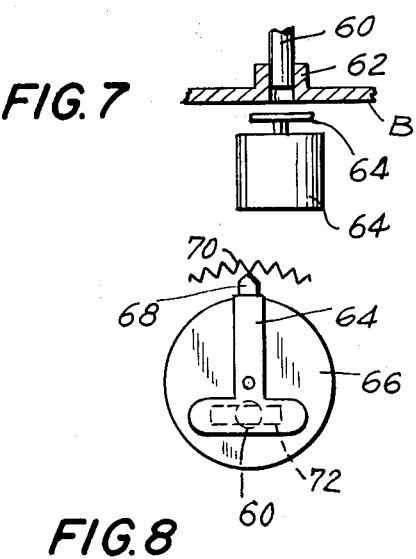

SINGLE LENS REFLEX CAMERA

BACKGROUND OF THE INVENTION

The present invention relates to cameras and is particularly adapted for use with single lens reflex cameras.

Cameras of this latter type may be provided with automatic exposure controls for determining automatically at least one of a number of exposure-determining variables such as exposure time or diaphgram setting. However, in some cases such automatic exposure-determining structure is not required and in fact is inconvenient.

Thus, when conditions are such that it is desirable to determine exposure in a fully manual manner, the automatic exposure-determining structure is redundant and represents an inconvenience. This is true not only from the operational standpoint but also from the manufacturing standpoint. Thus when cameras of the above type are manufactured considerable troubles and inconvenience are encountered in providing the camera with the structure for determining at least part of the exposure automatically.

SUMMARY OF THE INVENTION

It is accordingly a primary object of the present invention to provide a camera structure which will avoid the above drawbacks to a very large extent.

Thus, it is an object of the present invention to provide a camera which has the structure for automatically determining at least part of the exposure housed separately from the remaining camera structure so that when a fully manual operation is desired the camera need not be encumbered with a considerable part of the structure for automatically determining the exposure.

In addition it is an object of the present invention to simplify the manufacture of cameras of the above type by making it possible to assemble separately from the remainder of the camera a considerable part of the structure for automatically determining exposure.

Thus, it is an object of the invention to provide a camera, such as a single lens reflex camera, which can automatically determine a variable such as exposure time, diaphragm setting, or the like, but which at the same time can be operated in a fully manual manner without being encumbered by the structure for automatically determining at least part of the exposure.

In accordance with the invention the camera includes a housing means, a casing means, and a means for detachably connecting the casing means to the housing means. The camera housing means carries a manually operable means for determining exposure in a fully manual manner. Also, the housing means carries part of an automatic means for automatically determining at least one of a number of exposure variables which include diaphgram setting and exposure time. The remaining part of the automatic means is carried by the casing means so that the automatic means is only in a complete and operative condition when the casing means is connected with the housing means. The housing means has a movable means which moves in preparation for making an exposure and a motion transmitting means is operated on by this movable means and transmits motion to part of the structure in the casing means, when the latter is connected with the housing means, to operate the structure in the casing means in connection with automatically determining at least one of the above variables.

BRIEF DESCRIPTION OF DRAWINGS

The invention is illustrated by way of example in the accompanying drawings which form part of this application and in which:

FIG. 1 is a schematic representation of the operations which are carried out in connection with exposure of film in a camera;

FIG. 2 is a schematic representation of the basic structure of the present invention;

FIG. 3 is a partly sectional schematic front elevation of a camera, illustrating details of the combination schematically illustrated in FIG. 2;

FIG. 4 is a schematic fragmentary top plan view of the structure of FIG. 3;

FIG. 5 is a schematic representation of a control carried out with part of the structure shown in FIG. 4;

FIG. 6 is a schematic illustration of a different embodiment of a structure for providing cooperation between units illustrated in FIG. 2;

FIG. 7 is a fragmentary schematic elevation of a further embodiment of a structure for providing cooperation between units as illustrated in FIG. 2; and FIG. 8 is a schematic plan view of part of the structure of FIG. 7 further illustrating how this structure operates.

DESCRIPTION OF PREFERRED EMBODIMENTS

Referring to FIG. 1, there is diagrammatically illustrated therein the series of operations which are carried out in connection with film exposure in the camera such as a single lens reflex camera. When such a camera is equipped with a TTL (through the lens) light-measuring structure for participating in the operation of an automatic exposure control device, the photographing operation is carried out with a sequence of procedures as illustrated in the block diagram of FIG. 1. As may be seen from the left of FIG. 1, the initial operation is depression of the shutter button. Before the shutter is actually tripped and opened, the movement of the shutter button brings about several operations preparatory to actual opening of the shutter. These preparatory photographing operations are represented by the dot-dash block in FIG. 1 and include stopping down of the diaphragm to the preselected aperture, prior to opening of the shutter, swinging up of a light-reflecting mirror, thus blocking the travel of light through the objective of the camera to the viewfinder thereof, and, if the camera is of the type which includes a between-the-lens shutter rather than a focal plane shutter, these preparatory operations include temporarily closing the between-the-lens shutter. Because of the interruption in the receiving of light as a result of the above operations, it is necessary to memorize temporarily the luminance information of the subject to be photographed, which is to say the lighting conditions prevailing at the object which is to be photographed, and this memorizing operation is required to take place immediately before the preparatory photographing operations are started or with some types of cameras which have internal light-receiving elements, such an element must be adapted for mounting at a location so that it is in the optical light path immediately before or after starting of part of the preparatory photographing operations.

This structure for temporarily memorizing the lighting conditions at the object to be photographed usually takes the form of a memory means such as a capacitor capable of storing an electrical charge the magnitude of which is in accordance with the quantity of light at the object to be photographed. The mechanism of the camera and the electrical circuitry are operatively connected with each other in such a way that a memory switch connected in series with the memory capacitor opens immediately before or after the above preparatory photographing operations.

As is shown at the upper right part of FIG. 1, the preparatory photographing operations include such operations as setting the diaphragm to the preselected or predetermined aperture value, displacing the reflecting mirror out of the light path, blocking the travel of light coming in through the viewfinder, and temporarily closing the shutter in the case where the shutter is a between-the-lens shutter. In addition to these preparatory photographing operations which go forward in response to the depression of the shutter button, there are electrical operations according to which the light information is memorized, as indicated in the block at the lower left of FIG. 1, and in response to the memorized light information, after the above memory switch is opened, an operation is carried out in response to the memorized light information for determining the control of the exposure operation as shown by the blocks at the lower part of FIG. 1. Thus the combination of the mechanical operations, such as those set forth at the upper right of FIG. 1, and the electrical operations represented by the blocks along the lower part of FIG. 1 result in the final exposure operation according to which exposure is determined at least part in an automatic manner according to which a variable such as exposure time is determined automatically. Thus, in the example illustrated in FIG. 1 since the diaphragm is stopped down to the preselected aperture just prior to exposure, the automatic exposure operation will determine the exposure time.

It will be noted in accordance with the diagram of FIG. 1 that the electrical structure for participating in the automatic exposure controls, represented by the blocks at the lower part of FIG. 1, carries out a series of sequential operations distinct from the mechanical preparatory photographic operations such as those set forth at the upper right of FIG. 1 and represented by the upper central block of FIG. 1. In accordance with the present invention the electrical structure for carrying out the electrical operations are separately housed in a casing means B illustrated in FIG. 2 so that part or all of the automatic exposure control section is situated within a casing means B which is separate from the camera body A illustrated schematically at the lower part of FIG. 2. The structure of the invention is such that the casing means B can be detachably connected with the housing means which forms the camera body A, and as a result of the separate assembly of the automatic exposure determining structure in the separate casing means B the production and operation of the camera are greatly facilitated. With the present invention it has been found that a camera such as a single lens reflex camera will be capable of achieving a reliable accurate performance and will have an improved utility as a result of the separate unit which includes the casing means B and the electrical structure housed therein.

As may be seen from FIG. 2, the casing means B is adapted to be detachably connected with the housing means A of the camera. The housing means A is provided with a manually operable means available to the operator for manually determining exposure without any automatic features, so that, for example, the exposure time and diaphragm aperture can be externally controlled in a fully manual manner. In addition, however, the housing means A is provided with a TTL light-measuring section and with a mechanical transmission means represented by the mechanical connection illustrated at the left of FIG. 2. This motion transmitting means represented by the schematically illustrated mechanical connection of FIG. 2 is arranged in such a way that it will rotate or protrude with respect to the housing means A in response to an operation in preparation for making an exposure as carried out with the mechanical structure of the camera.

The casing means B houses in its interior electrical circuitry which includes a memory means represented by the illustrated memory circuit, and operating means represented by the illustrated operation circuit, and a control means represented by the illustrated control circuit. The memory means includes the schematically illustrated memory capacitor $C_M$ and the memory switch $S_W$ connected in series with the capacitor as illustrated. It is this memory switch $S_W$ which is operated by the mechanical transmission represented by the mechanical connection in FIG. 2. Thus when the mechanical motion transmitting means represented by the illustrated mechanical connection moves in the direction of the arrow shown in FIG. 2 the switch $S_W$ is opened, thus providing a signal transmitted from the housing means A to the casing means B for operating the electrical circuitry in the latter to bring about the automatic determination of at least one variable such as the exposure time. Of course, there are also other structures serving to transmit information in connection with the measured light and the information for determining the extent of exposure between the housing means A and the casing means B. Except for cameras which have a special construction, these additional means will take the form of electrical connecting means.

With an arrangement as shown in FIG. 2, the initial part of the movement of the shutter-tripping plunger in preparation for opening the shutter provides the advance notice of the photographing preparatory operations indicated at the lower left of FIG. 2 in the housing means A, and it is the movement of the plunger which displaces the transmission means formed by the illustrated mechanical connection so as to open the memory switch $S_W$ in the casing means B. Under these conditions where the memory capacitor $C_M$ has already stored an electrical charge the magnitude of which corresponds to the lighting conditions at the object to be photographed, as derived through the light-measuring or photometric section in the housing means A, the memory capacitor $C_M$ maintains its state so that the information is stored therein upon opening of the switch $S_W$. The voltage which appears across the memory capacitor $C_M$ under these conditions is then used together with other exposure factors in a mathematical operation which is carried out by the operation circuit shown in FIG. 2.

FIGS. 3 and 4 schematically illustrate in greater detail one possible manner in which the housing means A and the casing means B may be detachably connected to each other. Thus it will be seen that the casing means B is detachably connected to the bottom of the housing means A by way of a threaded bolt 10 extending freely through a sleeve 12 which extends upwardly through the interior of the casing means B, so that the upper free threaded end of the bolt 10 can be received in a nut 14 or the like fixedly carried by the housing means A at the bottom wall thereof. FIGS. 3 and 4 schematically illustrate a shutter-tripping plunger 16 accessible to the operator at the top of the housing means A for initiating the operations set forth above in connection with FIG. 1. The shutter-tripping plunger 16 may extend downwardly through the interior of the housing means A to terminate in a lower end region 18 which is slidable through an opening formed in the top of a cup-shaped receptacle 20 carried by the housing means A. The lower end region 18 may, however, be in the form of a separate motion-transmitting element responding to downward movement of the plunger 16 or the motion-transmitting means 18 may be formed by the free end region at the lower part of the plunger 16. The casing means B carries at its top wall an upwardly extending tubular extension 22 slidably received and guided in the cup-shaped receptacle 20 and in line with the motion-transmitting means 18 so as to receive and guide the latter. The switch $S_W$ is situated in the path of downward movement of the motion-transmitting means 18 so that when the operator displaces the shutter-tripping plunger 16 downwardly the switch $S_W$ will be opened to provide the automatic operations referred to above.

In addition, the casing means B carries the electrically conductive tubular elements 24 forming receptacles for electrically conductive prongs 26 connected to circuitry in the housing A, while the elements 24 are electrically connected with the circuitry in the casing means B, to provide the electrical connection between the control circuit means shown at the right of the casing means B in FIG. 2 and the exposure quantity determining factor box shown at the right of the housing means A in FIG. 2. Thus, this construction may be used to provide an electrical connection between the automatic circuitry and an element such as an electromagnet which automatically becomes deenergized to release a trailing curtain for terminating an exposure after an automatically determined exposure time has elapsed. The receptacles 24 which respectively receive the prongs 26 are guided in tubular guides 28 carried by the housing means A as shown in FIG. 3.

FIGS. 3 and 4 in addition schematically illustrate the objective 30 which includes the conventional structure for preselecting the diaphragm aperture which is to be used for exposure of the film. At the top of the housing means A is the viewfinder 32 as well as a manually turnable knob 34 available for setting the exposure time manually, as is well known. One of the graduations A at the knob 34 is used for the automatic determination of the exposure time when this graduation A is aligned with the index 36 at the top of the camera as shown in FIG. 4. As is shown in FIG. 5, when the knob 34 is turned to the position shown in FIG. 4 a cam 38 is turned to a position where it closes a switch 40 of the circuitry for rendering the electrical structure operative to determine automatically the exposure time in the illustrated example.

As is well known, in the housing means A there is a structure for stopping the diaphragm down to the preselected aperture in response to depression of the shutter button or plunger 16, and also at the same time operations such as swinging up of a light-reflecting mirror take place. It is also possible to provide an embodiment of the invention where the memory switch $S_W$ is opened upon termination of the stop-down operation of the diaphragm. In this case the motion-transmitting means formed by the mechanical connection indicated at the left of FIG. 2 operates with the final stage of the operation which provides the stopping down of the diaphragm to the preselected aperture, or this transmission of a signal to the automatic circuitry in the casing means B can take place at an early stage of the upward swinging of the mirror.

In this latter connection FIG. 6 schematically illustrates a mirror box 42 of a known construction which supports for swinging movement the schematically illustrated mirror 44 having a pin 46 guided for movement along the curved slot 48 in a known way, this mirror 44 normally receiving light travelling from the right toward the left, as viewed in FIG. 6, through the objective in order to reflect this light up to the viewfinder 32. When the shutter button or plunger 16 is depressed, there is an automatic release of a lever 50 which is connected through a known transmission to the pin 48 so as to swing the mirror 44 upwardly in preparation for making the exposure, and this lever 50 also, at its right end, as viewed in FIG. 6, actuates the mechanism which starts the diaphragm down to the preselected aperture. As is indicated in FIG. 6 it is possible for this lever 50 to act at its left end on a motion-transmitting means 52 in the form of a pin which is guided for vertical movement in a tubular extension 54 of the casing means B which is received in the cup-shaped receptacle 56 of the housing means A so as to be guided thereby. This pin or motion-transmitting means 52 may be directly connected with, while being insulated from and extending upwardly from the switch $S_W$, so that in response to the counterclockwise swinging of the lever 50 in a known way, the motion-transmitting means 52 is displaced downwardly, as viewed in FIG. 6, to open the switch $S_W$ automatically in order to transmit in this way a signal to the circuitry in the casing means B.

Thus, in accordance with the present invention part or all of the information-processing section of the automatic exposure control circuitry is encased within the casing means B which is separate from the camera housing means A. Therefore, where the photographic operation does not require automatic controls, the casing means B can be detached from the housing means A and the camera can be operated in a fully manual manner. Inasmuch as the electrical circuitry which processes the information can be manufactured separately from the camera housing means A which incorporates the mechanical section of the structure, the production of the camera of the invention is rendered far more convenient and simpler than conventional camera structures.

Thus, with the construction of a camera in accordance with the present invention the memory switch $S_W$ is arranged in the casing means B so that it is actuated by means of a mechanical connecting member or motion-transmitting means which is operable prior to the photographing preparatory operation or immediately before or after a part of these photographing preparatory operations. Unlike an arrangement where the memory switch is situated within the housing means A, this arrangement of the invention eliminates means for electrically connecting the memory switch section in the camera housing means with the memory circuit structure which includes the memory capacitor and other components. Such electrical connections when situated entirely within the camera housing means may provide noise-producing sources or, because they are exposed, may result in undesirable leakage of electricity. In addition long lead wires interconnecting these connecting sections may receive undesirable noise signals. With the structure of the present invention all of these disadvantages are avoided.

With the camera of the present invention where the signal indicating the preparatory photographic operations is transmitted from the camera housing means to the casing means by way of a mechanical transmission means, the light information can also be memorized not only by purely electrical structure but also by such arrangements as holding a pointer of an indicating instrument at its deflected position. In this case the pointer holding operations can be controlled directly by the use of the mechanical transmission resulting from the preparatory photographing operations. Thus, referring to FIG. 7, there is schematically indicated therein a mechanical transmission means 60 which can be either the pin 52 or the lower end region 18 of the plunger 16. This motion transmitting means 60 is guided for movement in the housing means A and is received in the tubular extension 62 of the casing means B, this tubular extension 62 being either the tubular extension 54 as shown in FIG. 6 or the tubular extension 22 shown in FIG. 3. However, in this case there is situated beneath the motion transmitting means 60, in the path of downward movement thereof, a freely swingable pointer 64 of a moving coil instrument 66 such as a galvanometer which is connected into the circuitry to position the pointer 64 at an angular position corresponding to the light received from the object which is to be photographed, as is well known in the art. As may be seen from FIG. 8, the pointer 64 is operatively connected with a slider 68 of a potentiometer 70 so that the slider 68 moves with the pointer 64 along the potentiometer. Situated directly beneath the pointer 64 on the housing of the instrument 66 is a block 72 which only permits a minute amount of downward deflection at the pointer 64 by the motion transmitting means 60 which is shown in phantom lines in FIG. 8. The end region of the pointer 64 which is beneath the motion transmitting means 60 is enlarged as indicated in FIG. 8 so that irrespective of the angular position of the pointer 64 the downwardly moving motion transmitting means will be able to hold the pointer against the block 72 so as to maintain the pointer stationary in response to the operations in preparation for making an exposure as described above. Thus in this case through the swingable pointer 64 it is possible to provide at the potentiometer 70 a resistance value which can be used for automatic control purposes instead of storing a charge in a capacitor as described above.

Thus, this particular feature extends the range of utility of the camera of the invention and enables the construction of the invention to be applied in a wide variety of automatic exposure control devices.

What is claimed is:

1. In a camera, housing means, casing means, and means detachably connecting said casing means to said housing means, said housing means carrying manually operable means for manually determining exposure variables which include exposure time and diaphragm aperture, and automatic means for automatically determining at least one of said variables, said automatic means being carried in part by said housing means and in part by said casing means so that when the latter is detached from said housing means a fully manual operation of the camera can be achieved while when said casing means is connected with said housing means automatic determination of at least said one variable can be achieved, said housing means carrying a movable means supported by said housing means for movement in preparation for making an exposure, and motion transmitting means extending between said housing means and casing means when the latter is connected with said housing means for transmitting movement from said movable means through said motion transmitting means to the interior of said casing means, said casing means carrying in its interior as the part of said automatic means which is situated in said casing means a means which is acted on by said motion transmitting means in response to movement of said movable means for controlling, at least in part, the part of said automatic means which is carried by said casing means.

2. The combination of claim 1 and wherein the part of said automatic means which is carried by said casing means includes electrical circuitry which has a memory means for storing an electrical quantity corresponding to measured light information, an operating means electrically connected with said memory means for determining at least in part the extent of exposure in accordance with said quantity, and control means electrically connected with said operating means to respond thereto for controlling the extent of exposure provided by said one variable.

3. The combination of claim 2 and wherein said memory means includes a switch acted upon by said motion transmitting means.

4. The combination of claim 2 and wherein said memory means includes a variable resistor acted upon by said motion transmitting means.

5. The combination of claim 2 and wherein said housing means carries a shutter-tripping plunger to be manually operated by the operator to make an exposure, said plunger forming said movable means and said motion transmitting means responding to movement of said plunger for transmitting the latter movement to said means in said casing means which is acted upon by said motion transmitting means.

6. The combination of claim 2 and wherein the housing means carries a mechanism operating in connection with swinging of a mirror and stopping down of a diaphragm of the camera, said mechanism forming said movable means and said motion transmitting means responding to movement of said mechanism for acting on the means in said casing means which responds to movement of said motion transmitting means.

7. The combination of claim 2 and wherein said variable is exposure time.

8. The combination of claim 2 and wherein said housing means and casing means include positioning means for determining the position of said casing means with respect to said housing means when said casing means is connected with said housing means, and said housing means and casing means also carrying electrical connecting means for electrically connecting electrical structure in said casing means and housing means to each other when said casing means is connected with said housing means.

* * * * *